(12) United States Patent
Ratinetz et al.

(10) Patent No.: US 11,622,530 B2
(45) Date of Patent: Apr. 11, 2023

(54) BIODEGRADABLE HYGIENIC GRANULES FOR CATS AND THE PRODUCTION PROCESS THEREOF

(71) Applicant: Yucan Corporation, New Providence (BS)

(72) Inventors: Eduardo Ratinetz, Miami, FL (US); Celso Rosa, Sao Paulo (BR)

(73) Assignee: Yucan Corporation, New Providence (BS)

( * ) Notice: Subject to any disclaimer, the term of this patent is extended or adjusted under 35 U.S.C. 154(b) by 176 days.

(21) Appl. No.: 16/909,251

(22) Filed: Jun. 23, 2020

(65) Prior Publication Data

US 2021/0392845 A1 Dec. 23, 2021

(51) Int. Cl.
*A01K 1/015* (2006.01)
(52) U.S. Cl.
CPC .................. *A01K 1/0154* (2013.01)
(58) Field of Classification Search
CPC ............... A01K 1/0154; A01K 1/0152; A01K 1/0155; A01K 1/0107; B01J 20/02; B01J 20/043; B01J 20/30; B01J 20/3007; B01J 20/3021; B01J 20/3028; B01J 20/3078; B01J 2220/42; B01J 2220/4806; A23P 30/20; A23P 30/25
See application file for complete search history.

(56) References Cited

U.S. PATENT DOCUMENTS

| | | | |
|---|---|---|---|
| 5,209,185 A * | 5/1993 | Chikazawa | A01K 1/0155 119/171 |
| 6,568,349 B1 * | 5/2003 | Hughes | B01J 20/24 119/171 |
| 7,089,882 B1 * | 8/2006 | Tsengas | A01K 1/0155 119/172 |
| 10,251,368 B1 * | 4/2019 | Bolka | A01K 1/0155 |
| 2006/0102085 A1 * | 5/2006 | Chen | A01K 1/0155 119/171 |
| 2007/0289543 A1 * | 12/2007 | Petska | A01K 1/0154 119/173 |
| 2011/0061598 A1 * | 3/2011 | Boxley | A01K 1/0155 119/173 |
| 2011/0174228 A1 * | 7/2011 | Liu | A01K 1/0154 119/173 |
| 2013/0213313 A1 * | 8/2013 | Wang | B01J 20/24 264/109 |
| 2013/0269623 A1 * | 10/2013 | Lawson | A01K 1/0155 119/171 |
| 2015/0128869 A1 * | 5/2015 | Raymond | A01K 1/0154 119/172 |
| 2017/0000079 A1 * | 1/2017 | Lau | A01K 1/0155 |

FOREIGN PATENT DOCUMENTS

WO 2019/169461 A1 9/2019

* cited by examiner

*Primary Examiner* — Trinh T Nguyen
(74) *Attorney, Agent, or Firm* — Myers Wolin, LLC

(57) ABSTRACT

There is disclosed biodegradable hygienic granules, with high liquid absorption properties for use in the retention of urine and domestic cat waste. The present disclosure also relates to the manufacture process of the granules.

12 Claims, 2 Drawing Sheets

BIODEGRADABLE HYGIENIC GRANULES FOR CATS AND THE PRODUCTION PROCESS THEREOF

FIELD OF THE PRESENT DISCLOSURE

The present disclosure relates to biodegradable hygienic granules, with high liquid absorption properties for use in the retention of urine and domestic cat waste. The present disclosure also relates to the manufacture process of the granules.

SUMMARY

The biodegradable hygienic granules of the present disclosure comprise cassava bran, obtained from starch processing, and sodium bicarbonate. The product is natural and has excellent absorption properties, which help in the disposal of the waste.

The granules according to the present disclosure are produced in an extruder, and then are sieved to achieve the desired granulometry. Then, the final product is packed in sacks.

DETAILED DESCRIPTION

Figures 1, 2:
FIG. 1 illustrates one embodiment of the present disclosure showing a clump of the biodegradable hygienic granules of the present disclosure after receiving a simulated urine dose.
FIG. 2 illustrates one embodiment of the present disclosure showing a dissolution test sequence in three different moments: 0 minutes, 2.5 minutes and 5 minutes.

The description of illustrative embodiments according to principles of the present disclosure is intended to be read in connection with the accompanying drawings, which are to be considered part of the entire written description. In the description of embodiments of the present disclosure herein, any reference to direction or orientation is merely intended for convenience of description and is not intended in any way to limit the scope of the present disclosure. Moreover, the features and benefits of the present disclosure are illustrated by reference to the exemplified embodiments. Accordingly, the present disclosure expressly should not be limited to such exemplary embodiments illustrating some possible non-limiting combination of features that may exist alone or in other combinations of features; the scope of the invention being defined by the claims appended hereto.

This disclosure describes the best mode or modes of practicing the present disclosure as presently contemplated. This description is not intended to be understood in a limiting sense, but provides an example of the present disclosure presented solely for illustrative purposes by reference to the accompanying drawings to advise one of ordinary skill in the art of the advantages and construction of the present disclosure.

One embodiment of the present disclosure relates to a natural product, more specifically to biodegradable hygienic granules for cats.

In a preferred embodiment of the present disclosure the biodegradable hygienic granules are based on cassava. The cassava brans are present in an amount of 99 wt. %. The cassava bran is a by-product of starch production and it is obtained by drying and then, toasting the residual cassava mass from the process.

In addition to the cassava bran, sodium bicarbonate is present in the bran in the biodegradable hygienic granules of the present disclosure. The sodium bicarbonate is mixed with the cassava bran in an amount of 1 wt. %, in order to retain the odor produced by urine.

One embodiment of the present disclosure also relates to the production process of the biodegradable hygienic granules comprising the steps of:
  (a) injecting water and steam into the extruder;
  (b) gradually feeding the extruder with cassava bran and sodium bicarbonate following the motor's amperage;
  (c) drying the extruded product;
  (d) cooling the product in a counterflow chiller;
  (e) grinding the product in roll mill; and
  (f) sieving the product.

In a preferred embodiment of the present disclosure, the process comprises the step of cleaning the equipment prior to the step (a), wherein said cleaning step comprises performing a flushing process in the extrusion machine and other equipment. The flushing might be performed with corn, wheat or soy bran.

A preferred embodiment of the process of the present disclosure also comprises collecting samples in steps (b) and (c), every 30 minutes to check and correct the system parameters whenever necessary.

In a preferred embodiment of the present disclosure, the final product of the process of the present disclosure is packed in sacks of 2 kg (6 L) each.

The hygienic granules obtained from this manufacturing process have biodegradable properties, which allows them to be disposed in the toilet (flushable). Due to its dissolving properties, the hygienic granules of the present disclosure will not lead to the sewage system clogging.

Depending on the natural composition, the product is non-toxic and does not represent any risk to humans or animals, even if ingested. The characteristic odor of cat urine is also mitigated by the granules.

The hygienic granules of one embodiment of the present disclosure have a great liquid absorption and form a consistent and firm clump, which facilitates the disposal of the box to the toilet or garbage. More specifically, the granules of the present disclosure have a liquid absorption of 760% in relation to its own weight.

The hygienic granules of one embodiment of the present disclosure have a low weight characteristic. More specifically, the granules of the present disclosure have a density of 330 g/L, and a tolerance of 20 g up or down.

EXAMPLES

1) Preparation

All equipment of the production process is preferably clean and free from residues of other productions. A flushing process composed of corn, wheat and/or soy bran is carried out in order to eliminate eventual residues in the extrusion machine and other equipment of the process.

The following parameters are adjusted:
Matrix: Stick 4/6 mm
Number of knives: 8
Vapor Pressure: 4 Kg
Amperage: 200 A
The dryer is activated and adjusted to 160° C. each of the four burners.
The cyclone is activated.

2) Production

After the preparation is completed, water and steam are injected into the extruder. The extruder is then gradually fed with the materials, following the motor's amperage. Machine interventions are preferably carried out to adjust the parameters until production stabilization. Thereafter, samples are collected every thirty minutes to check the conditions.

The extruded product follows to the dryer, where samples are also monitored and collected every 30 minutes to check and correct the system whenever necessary.

The product is taken to the counterflow cooler, where it is cooled to a temperature of 8° C. above room temperature, to ensure that there is no water formation, and consequently, no microorganisms development.

The product is taken to be crushed in a roller mill where the distance between the rollers is adjusted to the desire particle size, and then sieved.

In the sieved process, all particles over 2 mm (Tyler or TY 9) must be reprocessed in the mill to be broken down into smaller particles.

In order to obtain the ideal granulometry, the precision sieves TY 14 (1.18 mm) and TY 28 (0.6 mm) are also used to guarantee the uniformity and standardization of the product. The proportion of the content of the sieves in the final product (Hygienic Granules) is as follows:

TABLE 1

Granulometric composition of the final product.
Granulometric composition

| Mesh | Standard | Minimum | Maximum |
|---|---|---|---|
| Tyler 09 | 0 | 0 | 0 |
| Tyler 14 | 47% | 37% | 57% |
| Tyler 28 | 47% | 37% | 57% |
| Bottom (Fines) | 6% | 4% | 8% |

The final product has the 10% (±1%) of humidity and the characteristic color of the roasting of cassava bran, varying in shades of beige and ocher.

The mass per volume of the final product was determined by weighing 0.25 liters of the product. Five replicates were performed per sample and the results are shown in Table 2 below.

TABLE 2

Mass per volume of the final product.

| Replicate | Sample volume (ml) | Sample weight (g) | g/ml |
|---|---|---|---|
| 1 | 250 | 88.33 | 0.35 |
| 2 | 250 | 87.32 | 0.35 |
| 3 | 250 | 89.53 | 0.36 |
| 4 | 250 | 88.02 | 0.35 |
| 5 | 250 | 88.93 | 0.36 |
| | | Average | 0.35 |
| | | Std. dev. | 0.00 |

The product within the above-mentioned specifications is sent for packaging in plastic bags of the 5 Welds type, with approximate dimensions of 770×385×0,115 mm, with 2 Kg of granules, and a total volume of 6 liters.

The following tests were performed with the final product: 1) Absorption, 2) Clumping, 3) Dust, 4) Impact, 5) Dissolution and 6) GD4 Flushabilty Out of Scope Testing (FG501 Toilet and Drainline).

1. Absorption Test

The purpose of this test is to verify the absorption power of liquids, in proportion to the weight of the granules.

The sample was conditioned for 24 hours in 50+/−2% relative humidity and 73+/−3° F. The sample was soaked in 0.9% sodium chloride solution at room temperature for 15 minutes. The sample was drained for one minute on a 0.60 mm sieve and weighed. The amount of solution adsorbed was calculated along with the absorbance per gram.

The average grams of the sodium chloride solution absorbed per gram of the product was 7.62 grams, as shown in Table 3.

TABLE 3

Results of the abortion test of the final product.

| Replicate | Dry sample Weight (g) | Soak Time (min) | Drain Time (min) | Wet sample Weight (g) | Grams absorbed | Grams absorbed per gram of product |
|---|---|---|---|---|---|---|
| 1 | 10.90 | 15 | 1 | 94.12 | 83.22 | 7.64 |
| 2 | 10.82 | 15 | 1 | 93.06 | 82.24 | 7.60 |
| 3 | 10.85 | 15 | 1 | 93.30 | 82.45 | 7.60 |
| 4 | 10.78 | 15 | 1 | 93.42 | 82.64 | 7.67 |
| 5 | 10.79 | 15 | 1 | 92.78 | 82.00 | 7.60 |
| | | | | Average | 82.51 | 7.62 |
| | | | | Std. dev. | 0.42 | 0.03 |

2. Clumping Test

The purpose of this test is to verify the condition of the formed clump.

2.1. Clumping Time

A 30 milliliter solution of 0.9% sodium chloride in water was used to simulate a single dosage of cat urine. This solution was poured into a container of product that had a depth of 70 mm. After three minutes, the clump that was formed could be removed from the litter container completely intact. This was repeated for five samples.

2.2 Tight Clumping

A 30 milliliter solution of 0.9% sodium chloride in water was used to simulate a single dosage of cat urine. This solution was poured into a container of product that had a depth of 70 mm. After fifteen minutes, the clump that was formed was measured to be approximately 50 mm by 45 mm (See FIG. 1). The clump could be removed and handled without it breaking apart.

3. Percent Dust

The percent dust was calculated by pouring a bag of the cat litter into an enclosed system under vacuum. The amount of dust particles collected on the vacuum filter was weighed and compared to the initial weight of the cat litter.

The biodegradable hygienic granule of the present disclosure was calculated to be 99.99% dust free, as can be seen in Table 4.

TABLE 4

| Control | Secondary Filter | Secondary Filter |
|---|---|---|
| Receptacle Weight (g) | 63.04 | 256.94 |
| Receptacle with Dust (g) | 63.00 | 256.86 |
| Dust Accumulation (g) | −0.04 | 0.00 |
| Dust Total Accumulation (g) | 0.00 | |

TABLE 4-continued

| Control | Secondary Filter | Secondary Filter |
|---|---|---|
| Kitty Litter Mass | | |
| Kitty Litter with Bag (g) | 2560.0 | |
| Bag Weight (g) | 59.80 | |
| Kitty Litter Mass (g) | 2500.2 | |
| Kitty Litter Dust | | |
| Receptacle Weight (g) | 63.00 | 256.86 |
| Receptacle with Dust (g) | 63.24 | 256.82 |
| Dust Accumulation (g) | 0.24 | −0.04 |
| Dust from Kitty Litter (g) | 0.2 | |
| Percent Dust Accumulation (%) | 0.01 | |

4. Impact Test

The purpose of this test is to check the consistency of the clump, ensuring the integrity thereof from its formation until the final disposal.

Five samples were selected and each sample was sequentially released from heights of: 1, 1.5, 2.0 and 2.5 m, calculated from the ground, The test was successful for all samples, for each height.

5. Dissolution Test

The purpose of this test is to verify the dissolubility of the clump, to enable its disposal in the toilet.

The clump samples were immersed in a bowl with 3 L of water at room temperature. After 5 minutes, all samples had been almost completely dissolved. With a little stirring in the water—simulating the discharge—after the 5 minutes the samples were completely dissolved.

Figure 3:
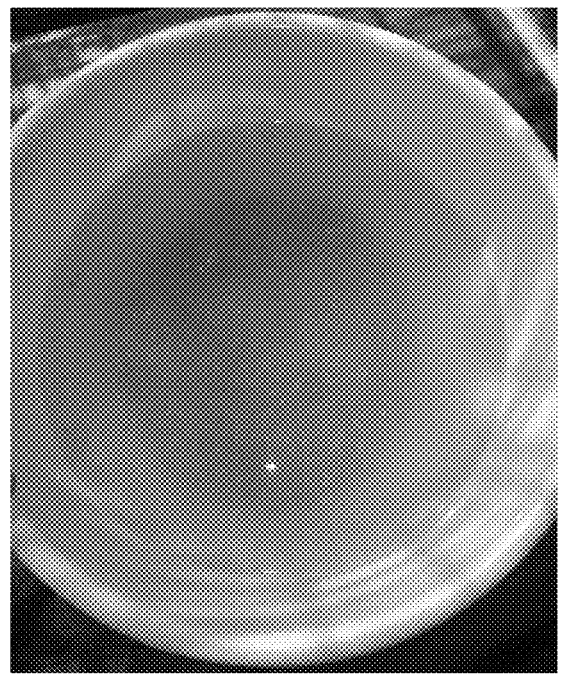
FIG. 3 illustrates one embodiment of the present disclosure showing the end of the dissolution test.

FIG. 2 shows the dissolution test sequence and FIG. 3 shows the end of the test.

6. FG501-Toilet Bowl and Drain-Line Clearance Test

This method is used to determine the likelihood that a product will successfully clear the toilet and drainage lines in a building.

The samples were tested on a Kohler Cimarron toilet connected to a 100 mm (four inch) clear PVC piping, 22.15 meters in length with a 2% slope, including two ninety-degree turns at 5 and 14 meters, two forty-five degree turns at 7 and 7.5 meters, and marked every 0.5 meters. The flush volume is six liters (1.6 gallons) or less, which is checked prior to testing and immediately after conclusion of testing.

Two simulated urine clumps of cat litter and three, fifteen grams of Simulated Fecal Matter (SFM) rolled in the cat litter, were used in the flushing sequence. Simulated urine clump samples were made by adding 30 ml of 0.9% sodium chloride solution to a three-inch bed of cat litter. The clumps remained in this litter for three minutes before adding them to the toilet. The SFM and urine clumps were allowed to sit in the toilet bowl water for three additional minutes before flushing.

Fifteen grams of SFM and 30 ml of 0.9% sodium chloride solution was used to mimic a typical cat's bowel movement weight and urine amount. The baseline data and validation was conducted with six sheets of a 4-inch-by-4-inch Quilted Northern bath tissue (unit dose) and Simulated Fecal Matter (SFM), and showed that the current toilet and drain-line configuration consistently moved product down the drain-line and passed the Center of Mass criteria for the Toilet Bowl and Drain-line Clearance Test method FG501. The distance the material traveled is recorded and the Center of Mass is determined.

This is followed by a simulated female urinary flush, which consists of 6 sheets of toilet paper. Once again, the distance and center of mass is determined. The female flush is followed by a simulated male flush, which is essentially an empty flush. This sequence is repeated many times to determine if the sample is causing any buildup in the toilet and drainline system.

Failure occurs if the samples plug the toilet and flushing is impeded or if the Center of Mass value rises for 5 consecutive flushes. This occurs when the samples build up in the drainline and are not fully expelled from the drainline system.

The sample passed the FG501 test using the above-mentioned flushing procedure. The urine clumps broke apart after sitting in the toilet bowl for three minutes and flushing them.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing describes the disclosure in terms of embodiments foreseen for which an enabling description was available, notwithstanding that insubstantial modifications of the present disclosure, not presently foreseen, may nonetheless represent equivalents thereto.

We claim:

1. Process for preparing a biodegradable granulate comprising the steps of:
    (a) injecting water and steam into extruder equipment;
    (b) gradually feeding the extruder with cassava bran and sodium bicarbonate following a motor's amperage to create an extruded product;
    (c) drying the extruded product;
    (d) cooling the extruded product in a counterflow chiller;
    (e) grinding the extruded product in roll mill;
    (f) sieving the extruded product to create biodegradable granulate;
    (g) cleaning the extruder equipment prior to the step (a);
    (h) wherein said cleaning step comprises performing a flushing process in the extruder equipment; and
    (i) wherein the flushing is performed with corn, wheat or soy bran.

2. Process according to claim 1, wherein in steps (b) and (c) samples are collected every 30 minutes to check and correct the system parameters whenever necessary.

3. Process according to claim 1, further comprising the step of packing the biodegradable granulate into packages of 2 kg of granulates after the step (f).

4. Process according to claim 1, wherein the dryer works with 4 burners with a temperature of 160° C. per burner.

5. Process according to claim 1, wherein the extruder amperage is 200 Amp.

6. Process according to claim 1, wherein, in step (f), all particles over 2 mm (TY 9) are reprocessed in the mill to be broken down into smaller particles.

7. Biodegradable granulate produced by the process of claim 1.

8. Biodegradable granulate comprising according to claim 7, having a humidity of 10±1% and a density of 330±20 g/L.

9. Biodegradable granulate according to claim 7, comprising cassava bran and sodium bicarbonate.

10. Biodegradable granulate according to claim 9, wherein the cassava bran is present in an amount of 99 wt % and the sodium bicarbonate, or other element, in an amount up to 50 wt %.

11. Biodegradable granulate according to claim 9, wherein the cassava bran is a sub product of amide production.

12. Biodegradable granulate according to claim 9, for use in the retention of urine and other waste from domestic cats.

* * * * *